United States Patent
Saito et al.

(10) Patent No.: US 8,260,029 B2
(45) Date of Patent: Sep. 4, 2012

(54) PATTERN SHAPE INSPECTION METHOD AND APPARATUS THEREOF

(75) Inventors: Keiya Saito, Hiratsuka (JP); Hideaki Sasazawa, Yokohama (JP); Takenori Hirose, Yokohama (JP)

(73) Assignee: Hitachi High-Technologies Corporation, Tokyo (JP)

( * ) Notice: Subject to any disclaimer, the term of this patent is extended or adjusted under 35 U.S.C. 154(b) by 478 days.

(21) Appl. No.: 12/620,713

(22) Filed: Nov. 18, 2009

(65) Prior Publication Data

US 2010/0124370 A1 May 20, 2010

(30) Foreign Application Priority Data

Nov. 19, 2008 (JP) ................................ 2008-295588

(51) Int. Cl.
*G06K 9/00* (2006.01)
(52) U.S. Cl. ........ 382/141; 382/145; 382/108; 356/600; 356/601
(58) Field of Classification Search .......... 382/141–154, 382/108, 199, 291; 356/237.1–237.5, 600–623
See application file for complete search history.

(56) References Cited

U.S. PATENT DOCUMENTS

| 7,233,390 | B2 | 6/2007 | Chang et al. |
| 7,369,703 | B2* | 5/2008 | Yamaguchi et al. ........... 382/199 |
| 2004/0070772 | A1 | 4/2004 | Shchegrov et al. |
| 2005/0264797 | A1* | 12/2005 | Nakano et al. ............. 356/237.2 |
| 2006/0269121 | A1* | 11/2006 | Yamaguchi et al. .......... 382/145 |
| 2011/0272096 | A1* | 11/2011 | Serikawa et al. ......... 156/345.24 |

FOREIGN PATENT DOCUMENTS

| JP | 2002-116011 | 4/2002 |
| JP | 2006-512561 | 4/2006 |

* cited by examiner

*Primary Examiner* — Hoa Pham
(74) *Attorney, Agent, or Firm* — Antonelli, Terry, Stout & Kraus, LLP.

(57) ABSTRACT

This invention relates to a pattern shape inspection method and an apparatus thereof for conducting a first step of irradiating wideband illuminating light which contains far ultraviolet light to a sample from a perpendicular direction, inspecting a shape of the pattern based on a spectral waveform of reflecting light detected from the sample, and detecting an edge roughness of the pattern based on the spectral waveform of the reflecting light detected from the sample, and a second step of irradiating a laser beam to the sample from an oblique direction, and detecting the edge roughness of the pattern based on scattered light detected from the sample.

14 Claims, 12 Drawing Sheets

PATTERN SHAPE INSPECTION METHOD AND APPARATUS THEREOF

BACKGROUND

1. Field of the Invention

The present invention relates to a pattern shape inspection method and an apparatus thereof, capable of inspecting a shape of a line pattern on a magnetic recording medium formed of a patterned medium, especially, an inspection object, for example, a discrete track medium, a stamper thereof, or a master as a mold of the stamper as well as a pattern edge state at high speeds with high sensitivity.

2. Description of the Related Art

Recently, a mobile device and AV equipment for digital recording have been rapidly proliferating in addition to the PC and server, and the demand for the use of hard disk drive (HDD) has been growing. Amounts of information processed by the HDD have also been dramatically increasing. Meanwhile, the HDD has been demanded to be compact to increase the recording density of the magnetic recording medium. The perpendicular magnetic recording process has been developed accompanied with the increase in the recording density of the HDD. With the perpendicular magnetic recording process, the influence caused by the magnetic interference between adjacent tracks becomes greater as the recording density is increased, thus reaching the limit. As the process for recording/replaying only the subject track, discrete track media have been developed for physically processing the track so as to be magnetically decomposed. Bit patterned media for recording a single bit on a single magnetic particle have also been under development for a further increase of the recording density.

Unlike the generally employed magnetic recording medium, the discrete track media and the bit patterned media require formation of a track pattern or a bit pattern. The size of the track pattern or the bit pattern is as fine as several tens nm. The optical nano imprinting technique is employed as the method for manufacturing the fine pattern at low costs.

Variation in the size or shape, deficiency and short-circuit of the pattern formed by the optical nano imprinting may cause operating failure, resulting in defect. It is therefore essential to inspect with respect to adequate formation of the pattern shape. The defect of the stamper as the pattern mold, if any, will be copied, and accordingly, the highly accurate inspection is required. In the case of the defect caused in the course of the manufacturing process, the pattern shape or the pattern state has to be inspected in detail for identifying the cause of the defect.

SEM (Scanning Electron Microscope) and AFM (Atomic Force Microscope) are well known for inspecting the defect of the fine pattern. However, they may be applied to the inspection only for the limited region in view of the throughput.

Meanwhile, an optical surface inspection device and an OCD (Optical Critical Dimension) measurement device are known as the device for detecting the fine defect and the pattern shape defect with the high throughput. U.S. Pat. No. 7,233,390 discloses the method for measuring the line pattern using the scatterometry as the generally employed OCD measurement device when roughness exists on the semiconductor pattern edge.

SUMMARY

In U.S. Pat. No. 7,233,390, the pattern edge roughness is expressed as a waveform formed of several frequency components by combining circular and oval shapes to fit the detected waveform. The edge roughness with the actual pattern has a complicated shape having the frequency components sequentially changed. Accordingly, how to express the roughness to approximate to the actual shape is not disclosed. Detection of the line edge roughness through a method other than the use of the scatterometry is not disclosed.

The present invention provides a pattern shape inspection method and an apparatus thereof to allow inspection of a fine line pattern shape (for example, width, height, side wall angle and the like of the track) with the size of approximately several tens nm or smaller which is formed on the magnetic recording medium as the patterned medium, especially, the inspection object such as the discrete track medium, the stamper thereof, and the master as the stamper mold as well as the pattern edge state (line edge roughness) at high speeds with high sensitivity.

The present invention provides a pattern shape inspection method and an apparatus thereof for performing a first step of irradiating a wideband illuminating light which contains far ultraviolet light from a perpendicular direction to a sample with a pattern which moves in a radial direction while rotating, inspecting a shape of the pattern based on a spectral waveform of light reflected from the sample to which the wideband illuminating light is irradiated and detected by a first sensor, and detecting an edge roughness of the pattern based on the spectral waveform of the light reflected from the sample and detected by the first sensor, and a second step of irradiating a laser beam to the sample from an oblique direction, and detecting the edge roughness of the pattern based on light scattered from the sample to which the laser beam is irradiated and detected by a second sensor.

In the present invention, when the edge roughness of the pattern is detected based on the light scattered from the sample in the second step, the edge roughness of the pattern is detected based on the spectral waveform of the reflecting light from the sample detected by the first sensor in the first step.

In the present invention, an optical model is formed to indicate a roughness layer formed on a pattern side wall surface corresponding to the edge roughness of the pattern, and to obtain an optical constant of the roughness layer through effective medium approximation. The optical model is used to detect the edge roughness of the pattern based on the spectral waveform of the light reflected from the sample and detected by the first sensor in the first step.

In the present invention, an optical model is formed to indicate a roughness layer formed on a pattern side wall surface corresponding to the edge roughness of the pattern, and to obtain an optical constant of the roughness layer through effective medium approximation. The optical model is used to detect the edge roughness of the pattern based on the spectral waveform of the light reflected from the sample and detected by the first sensor in the first step when the edge roughness of the pattern is detected in the second step.

The present invention provides a pattern shape inspection method and an apparatus thereof for irradiating the wideband illuminating light which contains the far ultraviolet light from a perpendicular direction to the sample which moves in a radial direction while rotating, inspecting the pattern shape based on the spectral waveform of the light reflected from the sample to which the wideband illuminating light is irradiated and detected by a first sensor, and further detecting an edge roughness of the pattern based on the spectral waveform of the light reflected from the sample and detected by the first sensor.

In the present invention, an optical model is formed to indicate a roughness layer formed on a pattern side wall surface corresponding to the edge roughness of the pattern and to obtain an optical constant of the roughness layer through effective medium approximation, and the optical model is used to detect the edge roughness of the pattern based on the spectral waveform of the light reflected from the sample and detected by a sensor.

In the present invention, the sample is one of a discrete track medium, a stamper as a mold of the discrete track medium, and a master as a mold of the stamper.

The present invention provides a pattern shape inspection method and an apparatus thereof for performing a first step of irradiating wideband illuminating light which contains far ultraviolet light to a sample with a pattern such as semiconductor ware from a perpendicular direction, inspecting a shape of the pattern based on a spectral waveform of reflecting light reflected from the sample to which the wideband illuminating light is irradiated and detected by a first sensor, and further detecting an edge roughness of the pattern based on the spectral waveform of the light reflected from the sample and detected by the first sensor, and a second step of irradiating a laser beam to the sample from an oblique direction, and detecting the edge roughness of the pattern based on light scattered from the sample to which the laser beam is irradiated and detected by a second sensor.

The present invention provides a pattern shape inspection method and an apparatus thereof for irradiating the wideband illuminating light which contains the far ultraviolet light to the patterned sample such as the semiconductor ware from the perpendicular direction, inspecting the pattern shape based on the spectral waveform of light reflected from the sample to which the wideband illuminating light is irradiated and detected by a sensor, and further detecting the edge roughness of the pattern based on the spectral waveform of the light reflected from the sample and detected by the sensor.

These features and advantages of the invention will be apparent from the following more particular description of preferred embodiments of the invention, as illustrated in the accompanying drawings.

DESCRIPTION OF THE PREFERRED EMBODIMENTS

Figure 1:
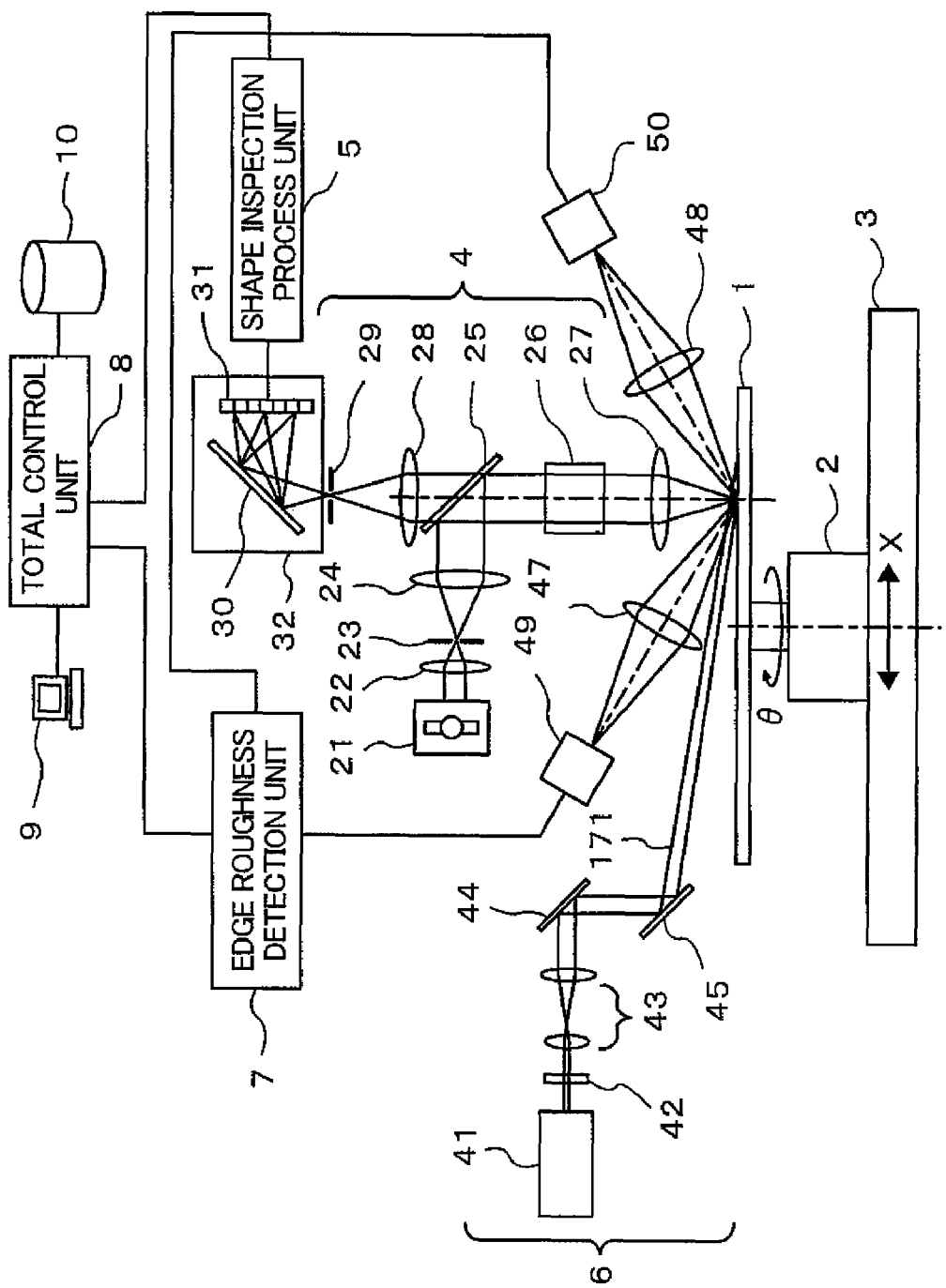
FIG. 1 schematically shows a structure of a pattern shape inspection apparatus as a first embodiment according to the present invention.

Embodiments of the pattern shape inspection method and the apparatus thereof according to the present invention will be described referring to the drawings.

First Embodiment

Figure 2:
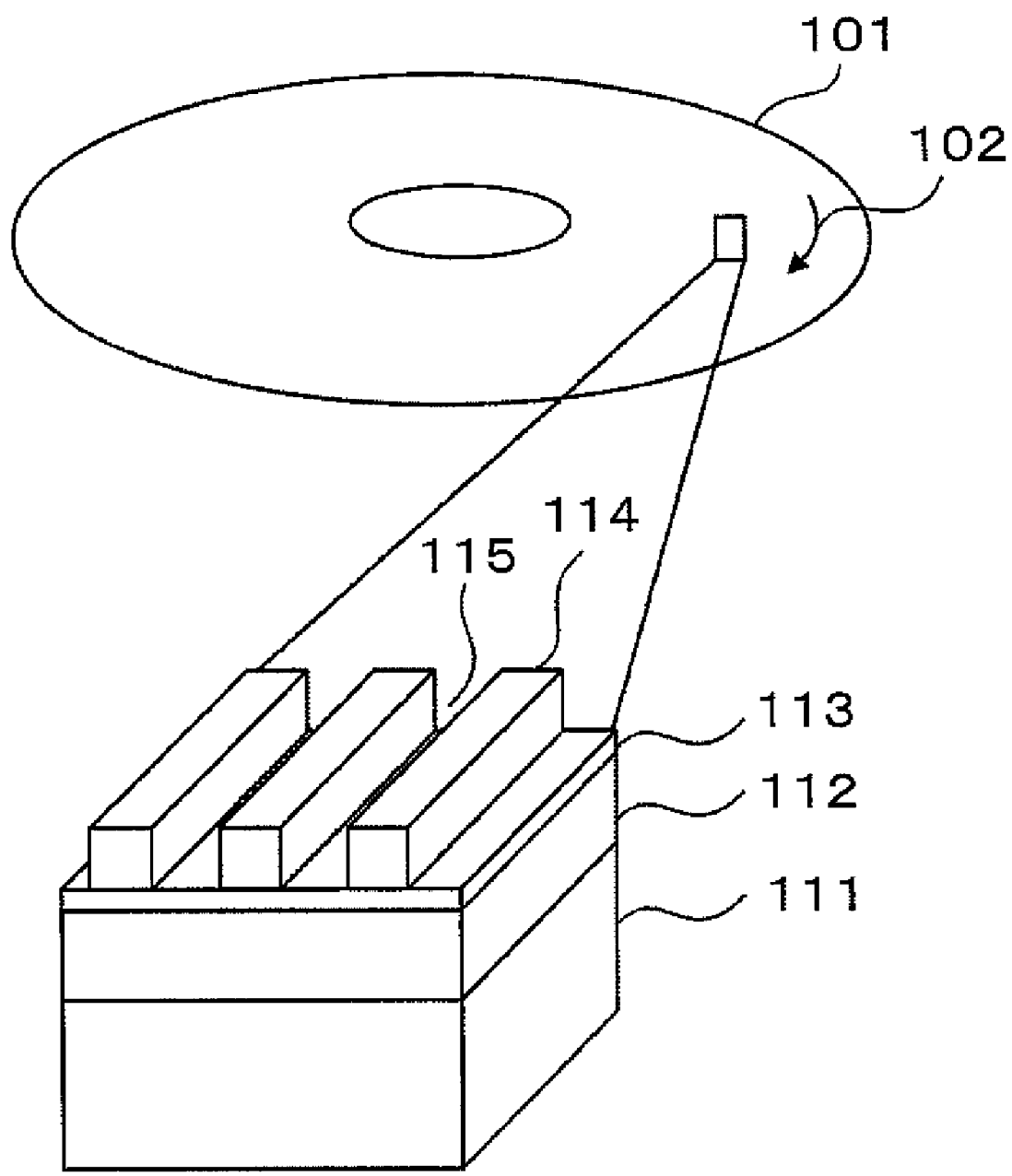
FIG. 2 is a perspective view showing a structure of a discrete track medium as an inspection object according to the present invention.

A first embodiment of the pattern shape inspection apparatus according to the present invention will be described in detail referring to FIGS. 1 to 10. FIG. 1 shows a structure of a pattern shape inspection apparatus according to a first embodiment of the present invention. FIG. 2 shows an inspection object in the form of a discrete track medium as a patterned medium of the magnetic recording medium according to the present invention. The pattern shape inspection apparatus of this invention is used for inspecting (detecting defects of) the pattern shape (for example, track width, height, side wall angle and the like of the track) including a pattern edge state (line edge roughness) of a discrete track medium 101 of a patterned medium for the magnetic recording medium shown in FIG. 2.

The pattern shape inspection apparatus includes a θ stage 2 which allows a sample 1 in the form of the discrete track medium 101 as the inspection object to be mounted thereon and rotated, an X stage 3 for moving the θ stage 2 to one direction, a spectral detection optical system 4 for irradiating a wideband illuminating light to the sample 1 as the inspection object to detect the spectral light from the sample 1, a shape inspection process unit 5 for inspecting the pattern shape of the inspection object from the detected spectral waveform, a scattered light detection optical system 6 for irradiating a laser beam to the sample 1 to detect the scattered light from the sample 1, an edge roughness detection unit 7 for detecting the edge roughness from the detected scattered light, a total control unit 8 for conducting total sequence control, an input/output terminal 9, and a database 10.

Figure 5:
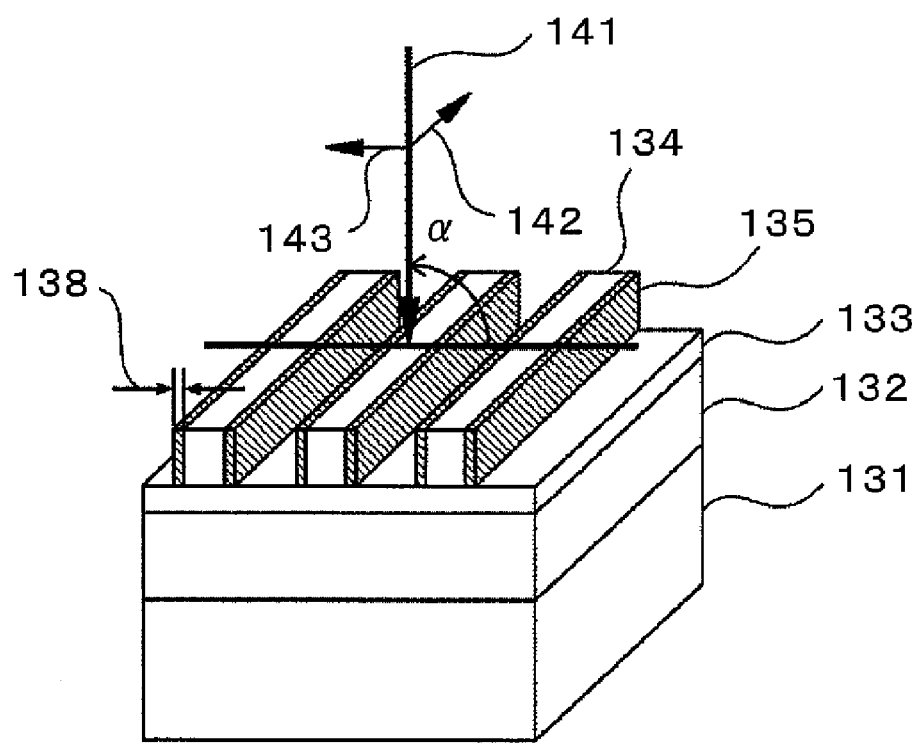
FIG. 5 shows a simulated optical model with a pattern edge roughness.

The spectral detection optical system 4 includes a light source 21 for irradiating a wideband illuminating light (with the wavelength from 200 to 800 nm, for example) which contains the far ultraviolet (DUV) light and the ultraviolet light, a condenser lens 22 for condensing the illuminating light, a field stop 23 for determining a detection field on the sample, a radiation lens 24, a half mirror 25, a polarizing prism 26 for polarizing the illuminating light toward a specific direction (polarizing the electric field direction to TE direction 142 in parallel with the direction of a pattern 134, and to a TM direction 143 perpendicular to the direction of the pattern 134 to match the pattern 134 formed on the sample 1 as shown in FIG. 5, an object lens 27 for condensing and irradiating the wideband illuminating light from the perpendicular direction to the detection field on the sample 1 to condense and detect light reflected (reflecting 0-order diffracted light (specular reflecting light)) from the detection field on the sample 1, an imaging lens 28 for forming an image of light reflected from the detection field on the sample and condensed by the object lens 27, a diaphragm 29 for shielding the stray light, and a spectroscope 32 for detecting the spectral waveform by a diffraction grating 30 and a linear sensor 31.

The scattered light detection optical system 6 includes a laser light source 41 for irradiating the visible laser with the wavelengths of 488 nm, 405 nm and the like, and the ultraviolet laser with the wavelength of 355 nm, a wave plate 42 which adjusts (selects) the polarizing direction of the laser beam suitable for conducting the defect detection with high sensitivity, a beam expander 43 for adjusting a beam diameter, a mirror 44 for reflecting the laser beam 171 to change the optical path of it, a mirror 45 for reflecting laser beam 171 to change the optical path of it to irradiate the sample 1 from an oblique direction, a first condenser lens 47 and a second condenser lens 48 for condensing lights scattered from the sample 1 to each direction, and a first detection unit 49 and a second detection unit 50 for detecting each of the condensed scattered lights.

An operation of the apparatus according to the first embodiment will be described. The sample 1 is retained and rotated on the θ stage 2, and moved to one direction above the X stage 3. The rotating position on the θ stage 2 and the movement position of the X stage 3 of the sample are recorded by the total control unit 8. The sample 1 as the discrete track medium 101 is formed of a substrate 111, a soft magnetic base layer 112, an intermediate layer 113, and a recording layer 114 as shown in FIG. 2. A track groove 115 is formed in the recording layer 114. The track groove 115 is formed in the discrete track medium 101 in a circumferential direction 102. In the actual product, the track groove is filled with a non-magnetic material (not shown in FIG. 2) for flattening the surface of the discrete track medium 101 to form the protection film and a lubricating film thereafter. The use of the medium having the concavo-convex portion of the pattern to be flattened stabilizes the floating amount of the magnetic head.

The spectral detection optical system 4 will be described. The light source 21 is formed of a Xe lamp, a halogen lamp, a deuterium lamp or combination thereof so as to irradiate the wideband illuminating light which contains the far ultraviolet (DUV) light (with the wavelength from 200 to 800 nm, for example). The illuminating light irradiated from the light source 21 is condensed on the field stop 23 by the condenser lens 22. The light path is bent at the half mirror 25 via the irradiation lens 24 for forming the image of the field stop 23 on the sample by the object lens 27 so as to form the detection field. The polarizing prism 26 allows selection of the illuminating light polarizing direction (TE polarization, TM polarization and a combination thereof, for example) with respect to the pattern formed on the sample. The light (0-order diffraction light) reflected from the sample 1 by the irradiation of the incident light (illuminating light) is condensed by the object lens 27 so as to be imaged on the diaphragm 29 by the imaging lens 28 through the polarizing prism 26 and the half mirror 25. The diaphragm 29 has the size adapted to the detection field on the sample 1 for shielding the stray light and the light which is not imaged on the diaphragm 29. The light reflected from the detection field and passed through the diaphragm 29 reaches the spectroscope 32. The spectroscope 32 subjects the reflected light to the spectroscopic process by the diffraction grading 30 so as to detect the spectral waveform by the sensor 31. The detected spectral waveform is subjected to an A/D conversion to obtain the spectral reflectance waveform which has been digitized by the shape inspection process unit 5. Then the shape inspection process unit 5 processes the digitized spectral reflectance waveform to inspect the pattern shape. The pattern shape inspection is conducted with respect to the pattern portion of the sample 1 as the inspection object, for example, the width, height, and side wall angle and the like of the recording layer 114.

Several methods have been employed for conducting the pattern shape inspection.

With the first method, a reference spectral reflectance waveform 61 is detected from a standard sample having a normal pattern preliminarily formed (standard sample with known pattern shape), or calculated by performing the electromagnetic wave analysis such as RCWA (Rigorous Coupled-Wave Analysis) so as to be stored in the database 10. The shape inspection process unit 5 calculates an average error (for example, square mean error) with respect to the wavelength between the spectral reflectance waveform 62 detected from the sample 1 as the actual inspection object and the reference spectral reflectance waveform 61 stored in the database 10. If the calculated value is equal to or larger than a threshold value, it is determined that the inspection object has an abnormality in the pattern shape (not conformed to the specified dimension or designed dimension).

With the second method, various reference spectral reflectance waveforms corresponding to the change in the pattern shape such as the width, height and side wall angle are preliminarily obtained by performing the electromagnetic wave analysis such as the RCWA from the reference spectral reflectance waveform 61 detected from the normal sample with the normal pattern so as to be stored in the database 10 as a library. The shape inspection process unit 5 compares the spectral reflectance waveform 62 detected from the sample 1 as the actual inspection object with the respective reference spectral reflectance waveforms stored in the library, and estimates the pattern shape of the actual inspection object from the matched reference spectral reflectance waveform. It is then determined whether or not the measured pattern shape is abnormal.

With the third method, the shape inspection process unit 5 calculates, in real-time, various reference spectral reflectance waveforms corresponding to the changed shape of the pattern through the electromagnetic wave analysis such as the RCWA with respect to the spectral reflectance waveform 62 detected from the sample 1 as the actual inspection object 1, and fits the respective calculated reference spectral reflectance waveforms with the spectral reflectance waveform 62 of the inspection object detected from the sample 1 as the actual inspection object. Then the pattern shape (width, height, side wall angle and the like of the pattern) of the actual inspection object is measured. It is determined whether or not the measured pattern shape is abnormal.

Figure 4:
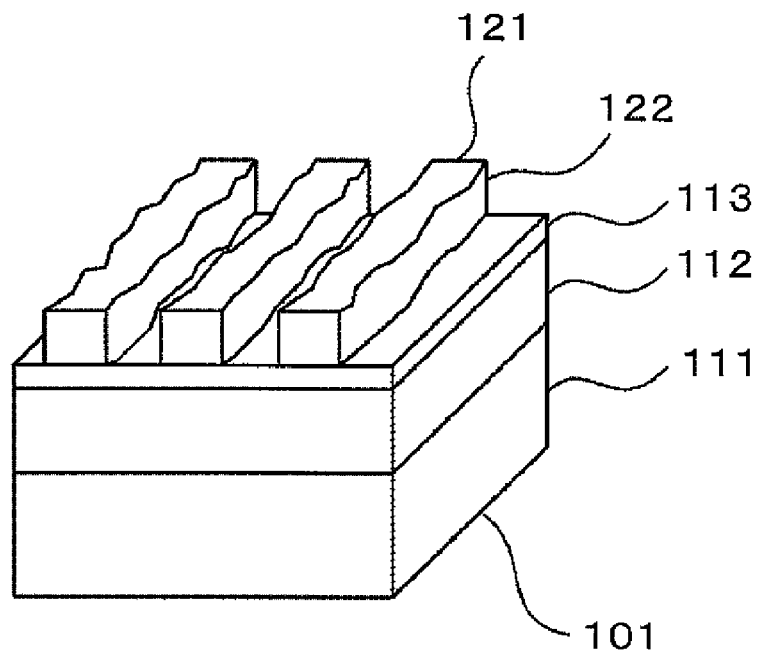
FIG. 4 is a perspective view representing a structure of the discrete track medium as the inspection object having the roughness on the pattern edge.

Hereinafter, the case where an edge (side wall) of a line pattern 121 of the discrete track medium 101 of the sample 1 as the inspection object having a roughness 122 will be described by referring FIG. 4. FIG. 4 is a perspective view showing a structure of the discrete track medium as the inspection object which has the roughness 122 on the line pattern edge.

Generally, the pattern formation through the nano imprinting is performed by embossing with the mold. The line edge roughness of the resist pattern will not be so deteriorated. However, depending on the condition of the subsequent etching process, the line edge roughness of the resist pattern may be deteriorated. There are two methods in forming patterns by etching, one is forming the recording layer 114 by etching the magnetic film, and another is etching the substrate or the thin film layer to form the pattern and then forming the magnetic film on the surface by sputtering. In the both cases, the edge roughness of the magnetic film pattern may be deteriorated depending on the etching condition.

If the roughness 122 is detected on the edge (side wall) of the line pattern 121, the spectral waveform detected by the spectroscope 32 may be influenced by the roughness. Then a new optical model is created to simulate the spectral reflectance waveform resulting from the pattern edge roughness. FIG. 5 illustrates the simulated optical model which has the pattern edge roughness. Specifically, the optical model of the line edge roughness includes a pattern edge 135 as a layer representing the edge roughness to obtain an optical constant N of the pattern edge 135 by performing the known effective medium approximation on the assumption that the edge roughness 122 is formed of a mixed phase (edge roughness) of a line pattern (material b) 121 and air (material a) in contact with the line pattern 121. The effective medium approximation is performed using the formula (1) below to obtain a dielectric constant $\epsilon$ of the mixed phase (edge roughness) from the dielectric constant $\epsilon_b$ of the material b (pattern) 121 and a dielectric constant $\epsilon_a$ of the material a (air) in contact with the pattern 121 in the case where the volume fraction of the material a (air in contact with the pattern edge), that is, $f_a$ is equal to 0.5. The optical constant $N=\sqrt{\epsilon}=n-jk$ of the edge roughness is obtained.

Referring to the optical model shown in FIG. 5, a reference numeral 131 corresponds to the substrate 111 of the discrete track medium 101, 132 corresponds to the soft magnetic base layer 112, 133 corresponds to the intermediate layer 113, and the line pattern 134 corresponds to the recording layer 114.

[Formula 1]

$$f_a \frac{\varepsilon_a - \varepsilon}{\varepsilon_a + 2\varepsilon} + (1-f_a)\frac{\varepsilon_b - \varepsilon}{\varepsilon_b + 2\varepsilon} = 0 \qquad (1)$$

where $\epsilon$ denotes a dielectric constant of mixed phase (edge roughness), $\epsilon_a$ denotes a dielectric constant of a material a (air), $\epsilon_b$ denotes a dielectric constant of a material b (pattern), and $f_a$ denotes a volume fraction of the material a (air).

The condition for the simulation is established by setting the incident angle of the incident light 141 to 0° ($\alpha=90°$: perpendicular direction), selecting the TE polarizing light 142 which directs the electric field of the incident light 141 in parallel with the direction of the line pattern 134 or TM polarizing light 143 which directs the electric field perpendicular to the direction of the line pattern 134, and setting the wavelength $\lambda$ from the far ultraviolet (DUV) light to the visible light to be in the range from 200 to 800 nm.

Under the aforementioned conditions (optical model of the line edge roughness (including the optical constant N of the pattern edge 135 obtained through the effective medium approximation) and the simulation condition), the simulation is conducted to obtain the spectral reflectance waveform $R_c(\lambda)$ of the reflecting 0-order diffraction light (reflecting angle 0°) from the sample 1 with the size including the edge roughness 122. Likewise, the reference spectral reflectance waveform $R_s(\lambda)$ of the sample 1 without the edge roughness 122 is obtained. Based on the spectral reflectance waveform $R_c(\lambda)$ with the edge roughness 122 and the reference spectral reflectance waveform $R_s(\lambda)$ of the sample, a determination index value D indicating each amount of change in the spectral reflectance waveforms is calculated using the following formula (2):

[Formula 2]

$$D=\Sigma\{R_c(\lambda)-R_s(\lambda)\}^2 \qquad (2)$$

where $R_c$ denotes a reflectance of the sample having shape (edge roughness) changed, $R_s$ denotes the reflectance of the reference sample, and $\lambda$ denotes the wavelength.

Figure 6:
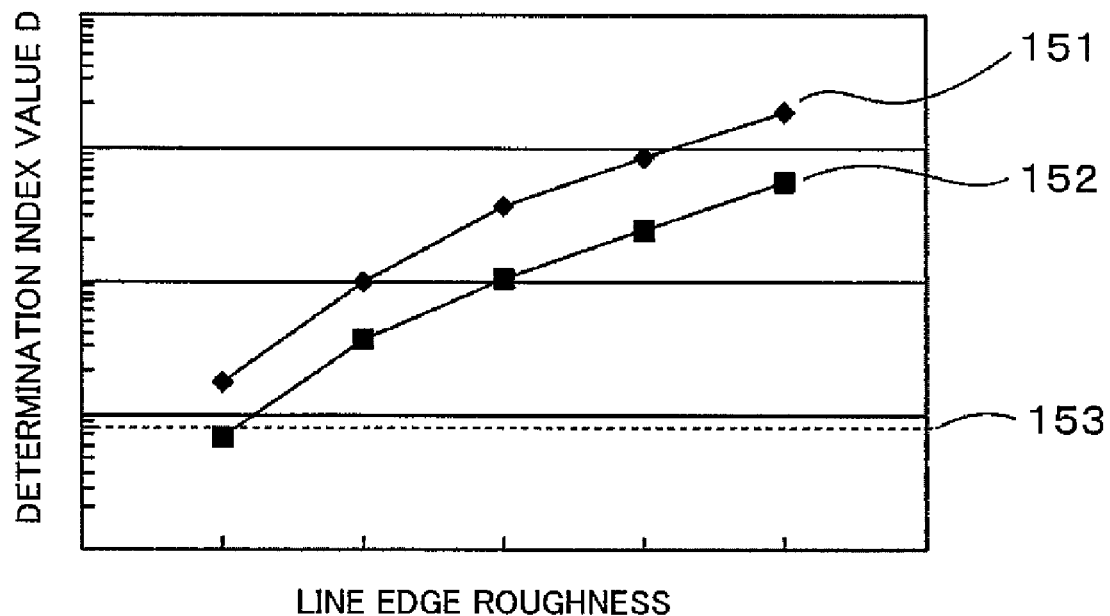
FIG. 6 represents determination index values each indicating a change amount of the spectral reflectance waveform corresponding to the change in the simulated edge roughness.

Likewise, when the size of the edge roughness 122 changes, that is, the film thickness 138 of the pattern edge 135 of the optical model shown in FIG. 5 changes, the resultant spectral reflectance waveform is obtained to calculate the determination index value D indicating the amount of change in the spectral reflectance waveform corresponding to the spectral reflectance waveform $R_s(\lambda)$ of the reference sample 1. An example of the aforementioned case will be shown in FIG. 6 in which X-axis denotes the line edge roughness, and Y-axis denotes the determination index value D. Data 151 and 152 are obtained in case of the TM polarizing light and the TE polarizing light, respectively. Referring to the data 151 with the TM polarizing light and the data 152 with the TE polarizing light, the determination index value indicating the amount of change in the spectral reflectance waveform is increased as the line edge roughness becomes large. In consideration with the S/N of the linear sensor 31 of the spectroscope 32 shown in FIG. 1, the threshold value 153 of the detectable amount of change in the spectral reflectance waveform is shown in FIG. 6. In the case where the line edge roughness in the order of nm exists, the amount of change in the spectral reflectance waveform may be detected in consideration of the threshold value 153.

The simulation results with respect to the line edge roughness as described above clearly show that the shape defect including the line edge roughness may be detected from the spectral reflectance waveform obtained by the shape inspection process unit 5.

Figure 3:
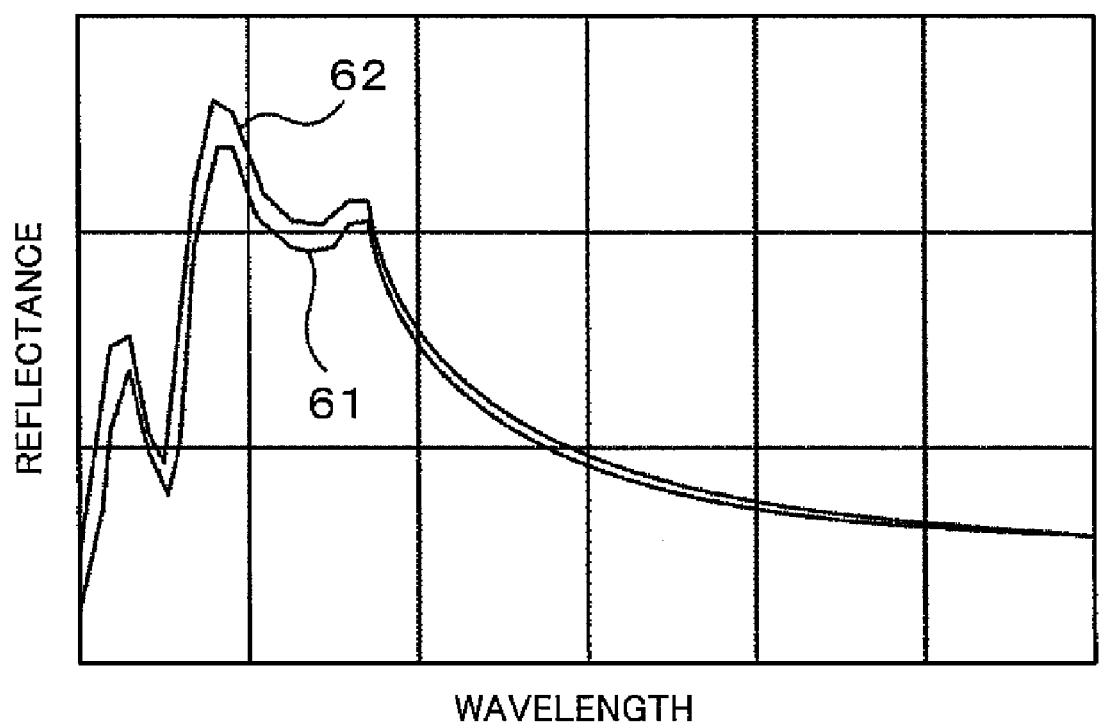
FIG. 3 is a view representing a relationship between a spectral reflectance waveform derived from the pattern shape inspection apparatus according to the present invention and a spectral reflectance waveform with a normal pattern.

According to the present invention, the shape inspection process unit 5 creates the optical model in consideration of the line edge roughness using the aforementioned method, based on which various reference spectral reflectance waveforms corresponding to the changed shape of the line pattern and the changed line edge roughness are calculated through the analysis using the RCWA method. The calculated reference spectral reflectance waveforms are subjected to fitting to the thus input spectral reflectance waveform 62 to obtain the shape and the line edge roughness of the line pattern as shown in FIG. 3. Based on the obtained line pattern shape and the line edge roughness, the determination with respect to the defect is made.

In the aforementioned method, the optical model is created on the assumption that the line edge roughness exists. This may increase the number of parameters, thus it needs much time for fitting. In the present invention, the other detection system is used for detecting whether or not the line edge roughness exists. The optical model for the line edge roughness is created only when the other detection system judges that line edge roughness exists, thus reducing the time for fitting.

Figure 7:
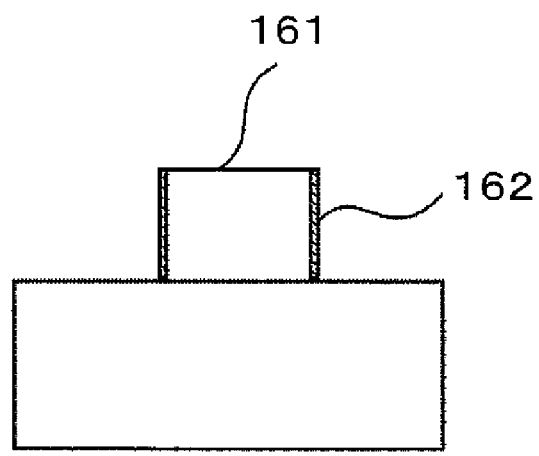
FIG. 7 is a view illustrating the way for expressing the degree of the edge roughness by a power spectral density function according to the present invention.
Figure 8:
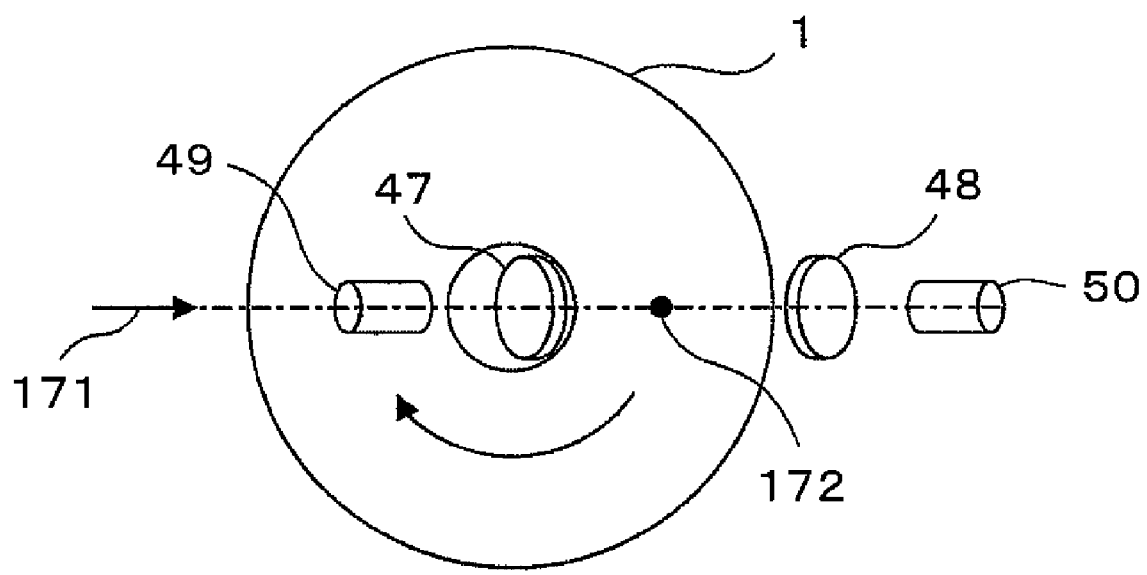
FIG. 8 is a plan view schematically illustrating a positional relationship with respect to detection units in a scattered light detection optical system as the first embodiment of the pattern shape inspection apparatus according to the present invention.

The method for detecting presence/absence of the line edge roughness using the other detection system, that is, the scattered light detection optical system 6 will be described referring to FIG. 1. The laser light source 41 of the scattered light detection optical system 6 is structured to irradiate the visible light laser with the wavelength of 488 nm, 405 nm and the like, and the ultraviolet laser with the wavelength of 355 nm. The polarizing direction of the laser beam irradiated from the laser light source 41 is selected to the one suitable for conducting the defect detection with high sensitivity using the wavelength plate 42. The beam diameter is adjusted by the beam expander 43, and the light path is bent by the mirrors 44 and 45 so as to irradiate the light to the same position as the detection field on the sample 1 from an oblique direction. The first condenser lens 47 and the second condenser lens 48 condense the scattered light from the pattern edge roughness of the sample 1, and the first detection unit 49 and the second detection unit 50 detect the condensed scattered light. The first detection unit 49 and the second detection unit 50 detect the scattered light with high sensitivity using the photomultiplier, for example. A signal current at the level corresponding to the scattered light intensity is applied to each of the first detection unit 49 and the second detection unit 50. Based on the signal current obtained by each of the first detection unit 49 and the second detection unit 50, when the signal intensity is equal to or higher than the preliminarily set threshold value, the edge roughness detection unit 7 determines that the line edge roughness is large. The relationship between the edge roughness and the scattered light will be described hereinafter. Assuming that the roughness is formed on the side wall portion 162 of the pattern 161 as shown in FIG. 7, the degree of the edge roughness is expressed by the power spectral density function to analyze intensity and direction of the scattered light so as to clarify the relationship between the edge roughness and the scattered light. As a result, it is expected that the scattered light intensity is intensified to the rear and front of the laser incident light, at which the first detection unit 49 and the second detection unit 50 are disposed, respectively. The positional relationship of the detection units is shown by a plan view of FIG. 8. Referring to FIG. 8, the light of the laser beam from the laser light source 41 in the incident direction 171, which is scattered from the irradiation position 172, is condensed by the first condenser lens 47 and the second condenser lens 48 so as to be detected by the first detection unit 49 and the second detection unit 50. The edge roughness detection unit 7 determines whether or not the edge roughness is large. The relationship between the edge roughness and the scattered light intensity is measured in advance so as to detect the degree of the edge roughness based on the detected scattered light intensity.

Figure 9:
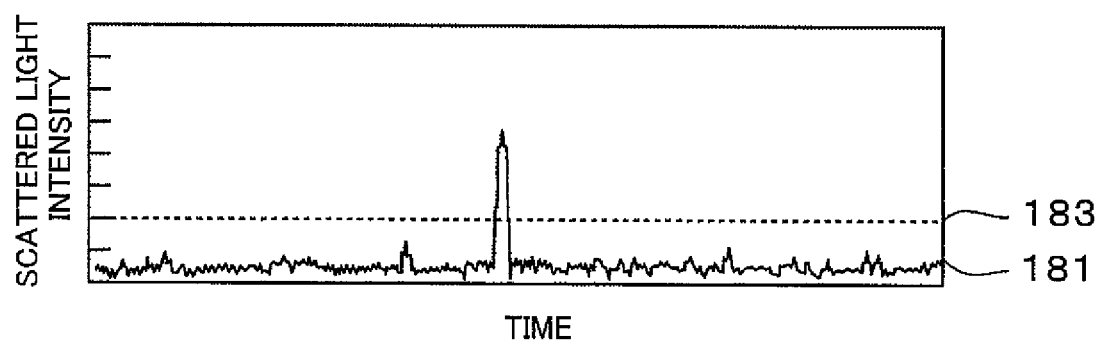
FIGS. 9A and 9B show scattered light intensity signals detected by the scattered light detection optical system as the first embodiment of the pattern shape inspection apparatus according to the present invention.
Figure 9:
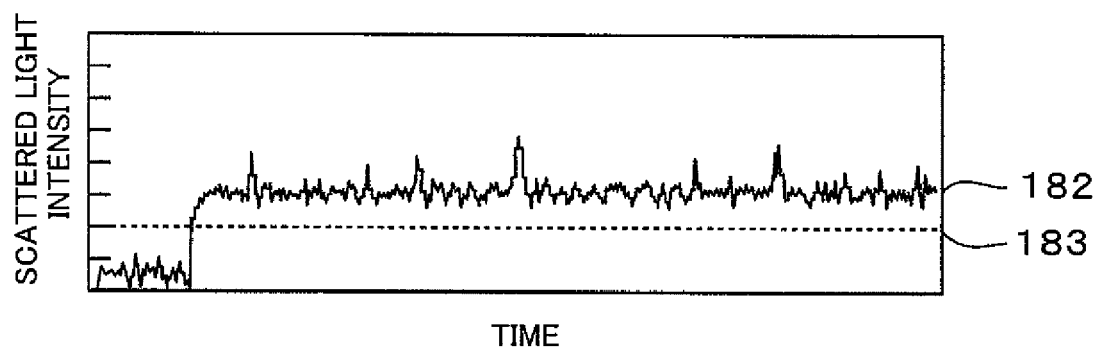

Because of a very small pattern pitch of the discrete track medium of several tens nm, the high order reflecting diffraction light other than the 0-order light from the laser incident light 171 does not appear. The scattered light is not generated from the line pattern which is formed with high precision. However, if the sample 1 has such defect as foreign substance, scratch and the like, the scattered light detection optical system 6 may detect the scattered light caused by the defect. In the aforementioned case, the direction in which the scattered light is intensified is different between the defect such as the foreign substance and the scratch, and the edge roughness. The detection optical systems (for example, 47, 49; 48, 50) are disposed to adapt the aforementioned difference so as to distinguish the defect from the edge roughness. Based on the difference between the change in the signal current obtained by the first detection unit 49 as elapse of time and the change in the signal current obtained by the second detection unit 50, the defect such as the foreign substance and the scratch may be distinguished from the edge roughness. FIG. 9 graphically shows the scattered light intensity signal detected at each detection position as the elapse of time while rotating the sample 1 at the angle of θ. FIG. 9A illustrates a scattered light intensity signal 181 when detecting the defect such as the foreign substance and the scratch (in case of the defect, the duration of θ-rotation is very short). FIG. 9B illustrates a scattered light intensity signal 182 when detecting the edge roughness (in case of the edge roughness, the duration of θ-rotation is long). The edge roughness detection unit 7 is allowed to preliminarily set the threshold value 183 with respect to the scattered light intensity signals 181, 182, measure the duration for which the scattered light intensity is kept equal to or larger than the threshold value 183, and distinguish the defect such as the foreign substance and the scratch from the edge roughness based on the length of the measured duration.

If the sample 1 has the defect such as the foreign substance and the scratch, the scattered light from the defect is generated at the upper portion so as to be condensed by the object lens 27 and the imaging lens 28 of the spectral detection optical system 4, and further detected by the spectroscope 32 as the noise. In the aforementioned case, the shape inspection process unit 5 eliminates the reflectance component corresponding to the wavelength of the laser beam irradiated from the laser light source 41 from the spectral reflectance waveform obtained based on the spectral waveform detected by the spectroscope 32 so as to conduct the spectral detection without being influenced by the scattered light.

Figure 10:
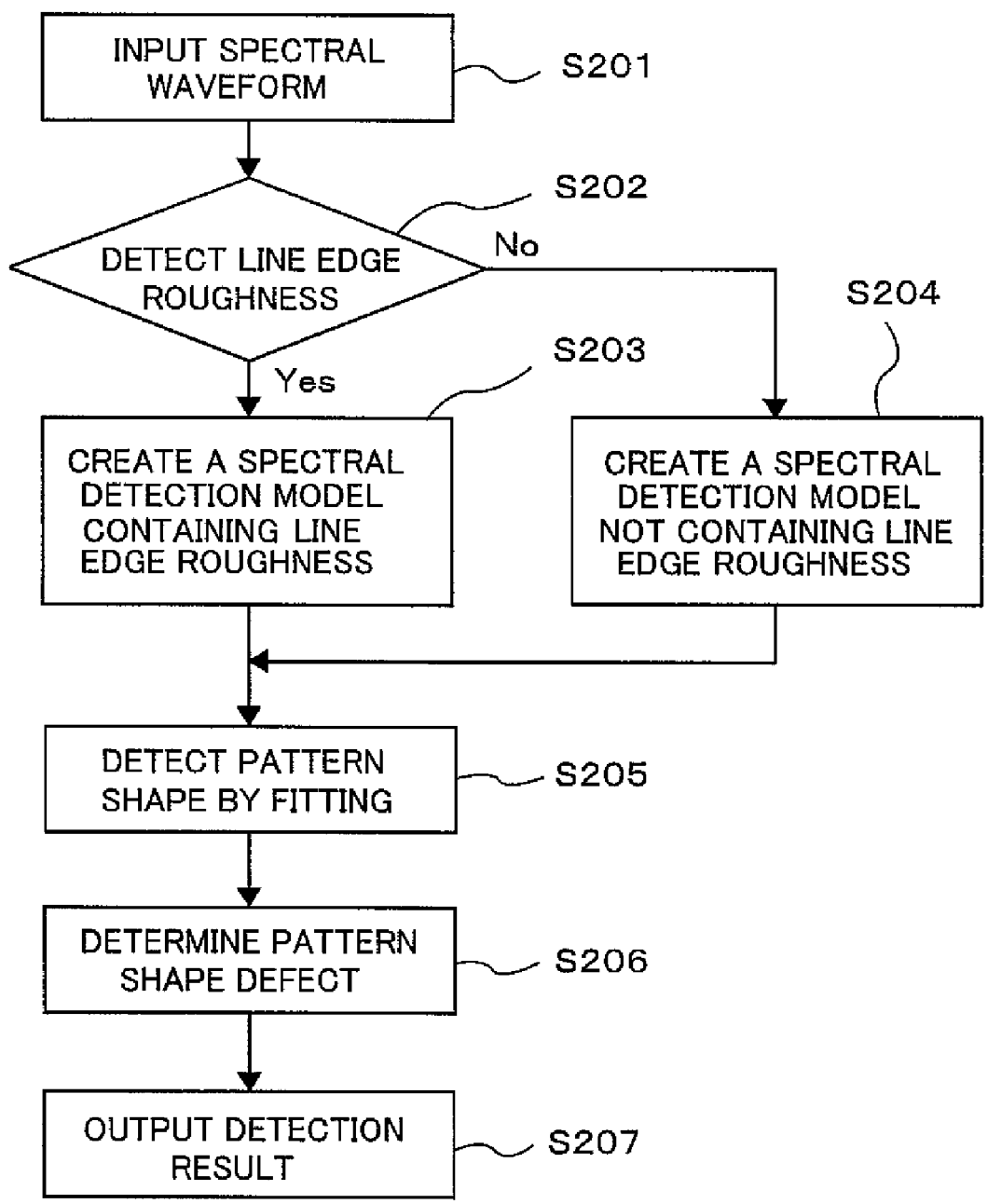
FIG. 10 is a flowchart representing a routine of the shape inspection process according to the first embodiment of the present invention.

The routine of the process executed in the shape inspection process unit 5 according to the first embodiment will be described referring to FIG. 10. The spectral detection optical system 4 performs spectral detection of the reflecting light from the sample 1, and inputs the spectrally detected spectral reflectance waveform into the shape inspection process unit 5 (S201). Simultaneously the total control unit 8 confirms whether or not the edge roughness detection unit 7 has detected the edge roughness (S202). The edge roughness detection unit 7 confirms presence/absence of the line edge roughness based on the scattered light from the sample 1, which is detected by the scattered light detection optical system 6, then the total control unit 8 receives the information with respect to the confirmed presence/absence of the line edge roughness from the scattered light detection optical system 6.

If the edge roughness detection unit 7 detects the edge roughness, the shape inspection process unit 5 creates the optical model which contains the line edge roughness as a first spectral detection model (S203). The width, height, side wall angle, edge roughness degree of the line pattern may be used as parameters for the created first spectral detection model.

If the edge roughness detection unit 7 does not detect the edge roughness, the shape inspection process unit 5 creates the optical model which does not contain the line edge roughness as a second spectral detection model (S204). The width, height and side wall angle of the line pattern may be used as parameters for the created second spectral detection model.

The shape inspection process unit 5 calculates various reference spectral reflectance waveforms with respect to the first spectral detection model which contains the line edge roughness or the second spectral detection model which does not contain the line edge roughness by conducting the electromagnetic wave analysis such as the RCWA, and fits the calculated various reference spectral reflectance waveforms with the spectral reflectance waveform 62 detected from the sample 1 as the actual inspection object to measure the pattern shape of the actual inspection object (for the first spectral detection model, the width, height, side wall angle, and the edge roughness degree of the line pattern, and for the second spectral detection model, width, height and side wall angle of the line pattern) (S205). Then the shape inspection process unit 5 determines whether or not the shape of the measured line patterns is defect (contains the edge roughness degree for the first spectral detection model) to conduct the defect inspection of the line pattern (S206). If the line pattern shape has a defect, the position, type and degree of the defect are stored in the database 10 (S207). Thus, the process for the line pattern shape inspection on a single point of the disk ends. The inspection of the entire surface of the disk is completed by repeatedly executing the aforementioned process while rotating and linearly moving the disk.

The total control unit 8 may be structured to execute a part of the process (creation of the optical model, fitting) executed by the shape inspection process unit 5.

Second Embodiment

Figure 11:
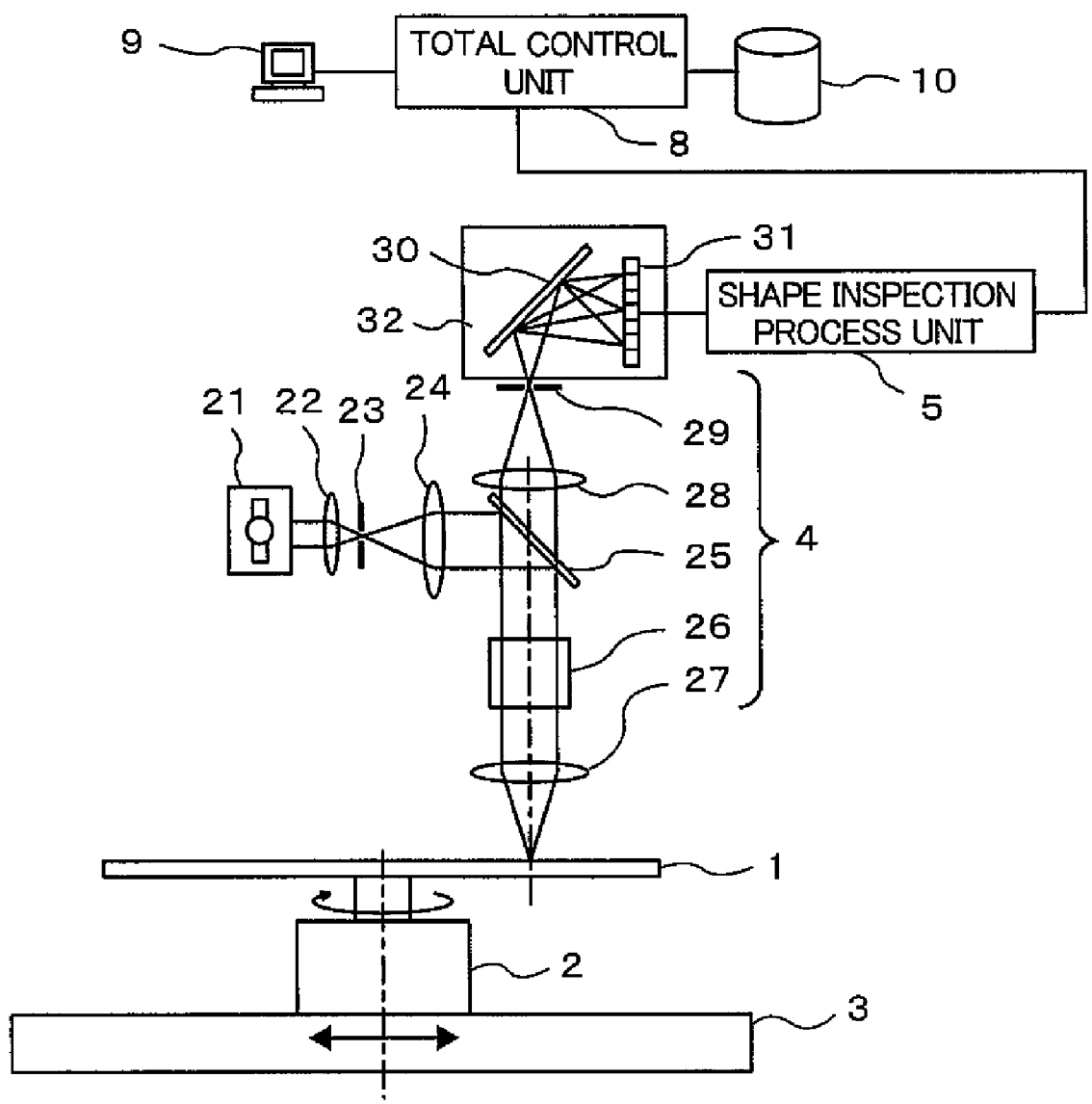
FIG. 11 schematically shows the structure of a pattern shape inspection apparatus as a second embodiment of the present invention.

A second embodiment of the pattern shape inspection apparatus according to the present invention will be described referring to FIGS. 5, and 11 to 13. FIG. 5 illustrates the simulated optical model with the pattern edge roughness. FIG. 11 schematically shows the structure of the pattern shape inspection apparatus according to the second embodiment of the present invention.

Unlike the first embodiment, the second embodiment is not provided with the scattered light detection optical system 6, and the line pattern edge roughness on the patterned medium 101 is detected only by the spectral detection optical system 4.

The structure of the second embodiment is the same as that of the first embodiment except that the scattered light detection optical system 6 is not provided. The operation of the second embodiment is the same as that of the first embodiment except the process executed by the shape inspection process unit 5.

The process to be executed by the shape inspection process unit 5 will be described. The shape inspection process unit 5 calculates the determination index value D indicating the change in the input spectral reflectance waveform using the formula (2) based on the reference spectral reflectance waveform. If the determination index value D is equal to or larger than the threshold value, it is determined that the defect exists in the shape of the line pattern of the inspection object (not conforming to the standard dimension or designed dimension). At this time, however, it is impossible to judge whether the defect of the line pattern shape is caused by the change in the line pattern shape or the edge roughness.

The optical model shown in FIG. 5 is used for the simulation to clarify the difference in the change of the spectral reflectance waveform between the case where the pattern of the sample 1 has the edge roughness and the case where the pattern shape changes. The condition for the simulation is the same as that of the first embodiment. The width, height and side wall angle of the line pattern may be used as the parameters for the line pattern shape. In this case, the width of the line pattern is selected as the parameter for the line pattern shape, which has a magnitude of the change substantially the same as that of the edge roughness degree. The spectral reflectance waveforms are obtained from the case where the edge roughness exists and the case where the pattern shape is changed. Based on the reference spectral reflectance waveform with no edge roughness or the pattern edge change, the determination index value indicating the amount of change in the spectral reflectance waveform is calculated. In the second embodiment, the wavelength dependent determination index value indicating the amount of change in the respective waveform section is used as the determination index value indicating the amount of change in the spectral reflectance waveform instead of using the formula (2) as in the first embodiment.

Figure 12:
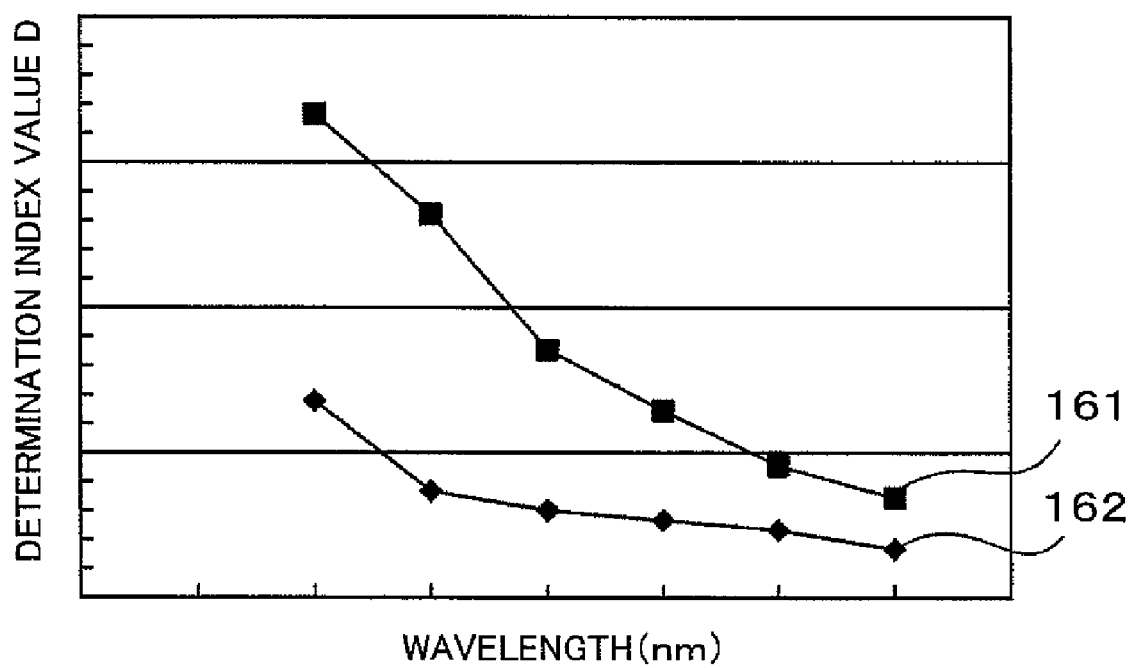
FIG. 12 is a view showing each change in the simulated wavelength dependency of the spectral reflectance waveforms between the pattern shape and the edge roughness (wavelength dependent determination index value for each wavelength section)

FIG. 12 shows the wavelength dependent determination index values each indicating the amount of change in the wavelength sections, which are calculated in case of the TM polarized light is selected. In FIG. 12, a wavelength dependent determination index value 161 is large at the short wavelength side when the pattern shape changes. On the other hand, a wavelength dependent determination index value 162 to the pattern having edge roughness changes small with respect to the wavelength. By using the above feature, the change in pattern shape and the edge roughness are distinguishable in the spectral reflectance waveform.

The shape inspection process unit 5 may be structured to detect (distinguish) the pattern shape change from the edge roughness based on the results as above (wavelength dependent determination index value indicating the amount of change in the respective wavelength sections).

Figure 13:
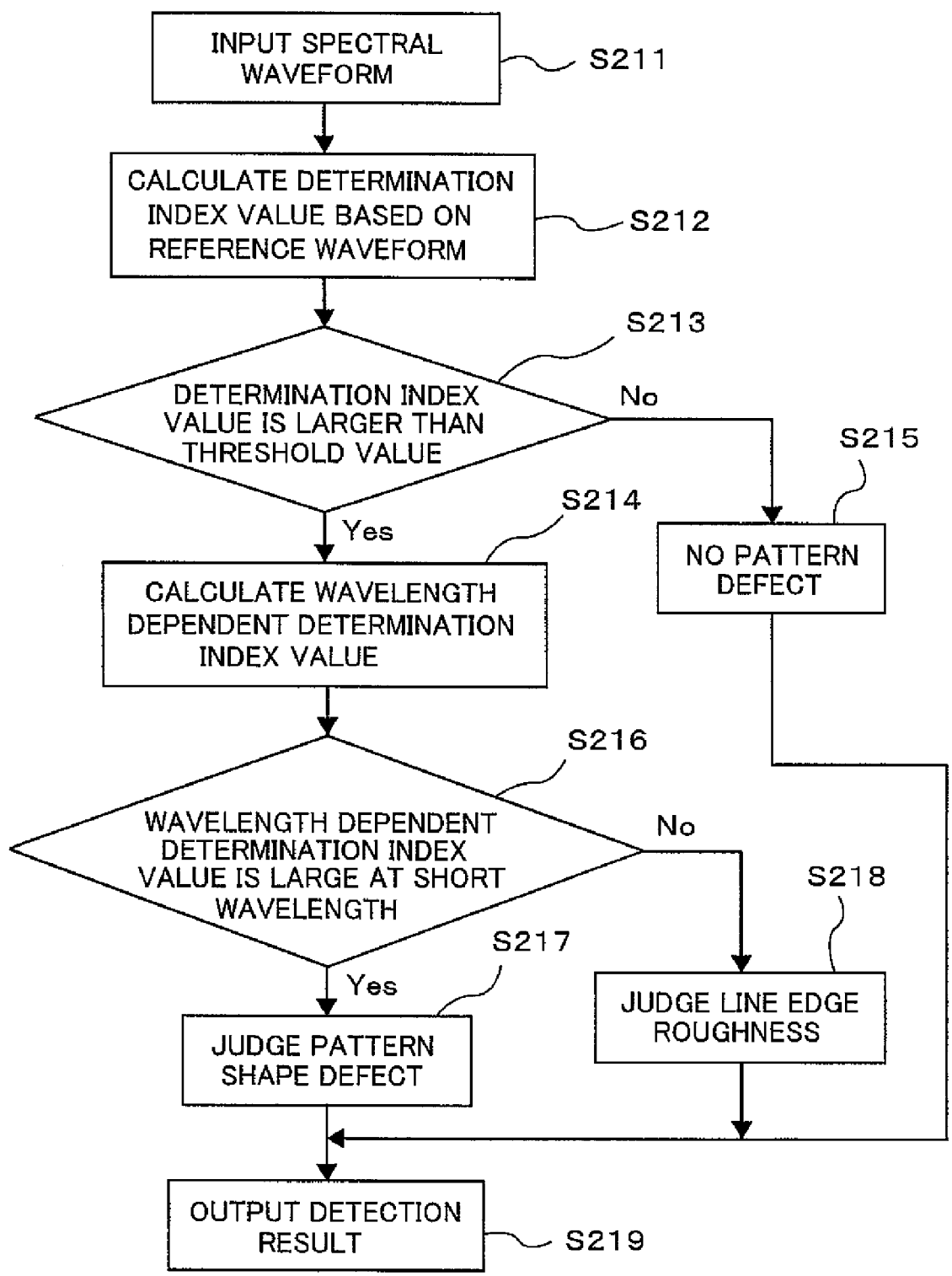
FIG. 13 is a flowchart representing the routine of a shape inspection process according to the second embodiment of the present invention.

The routine of the process executed by the shape inspection process unit 5 according to the second embodiment will be described referring to FIG. 13. The spectral detection optical system 4 spectrally detects the reflecting light from the sample 1, and the spectrally detected spectral reflectance waveform is input to the shape inspection process unit 5 (S211). The shape inspection process unit 5 calculates the determination index value D indicating the change in the spectral reflectance waveform of the input spectral reflectance waveform (S212) based on the reference spectral reflectance waveform by using the formula (2). The shape inspection process unit 5 determines whether or not the calculated determination index value D is equal to or larger than the predetermined threshold value (S213). If the determination index value D is equal to or larger than the threshold value, the shape inspection process unit 5 calculates the wavelength dependent determination index value for each wavelength section with respect to the amount of change in the spectral reflectance waveform as described above (S214). After calculation of the wavelength dependent determination index value, it is determined whether or not the wavelength dependent determination index value is large at the short wavelength side (S216). If the wavelength dependent determination index value is large at the short wavelength side, it is determined that the line pattern shape has the defect (S217). Meanwhile, if the wavelength dependent determination index value is not large at the short wavelength side, it is determined that the line edge roughness degree is high (S218). If the determination index value D is equal to or smaller than the threshold value, the shape inspection process unit 5 determines that no pattern defect exists (S215).

In the aforementioned process, if the shape inspection process unit 5 determines there exists a pattern shape defect, the position and type of the defect will be recorded in the database 10 (S219). The process for the pattern shape inspection on a single point of the disk is completed. The aforementioned process is repeatedly executed while rotating and linearly moving the disk to allow the inspection of the entire surface of the disk.

In the second embodiment, like the first embodiment, the total control unit 8 can execute a part of the process executed by the shape inspection process unit 5.

Figure 14A:
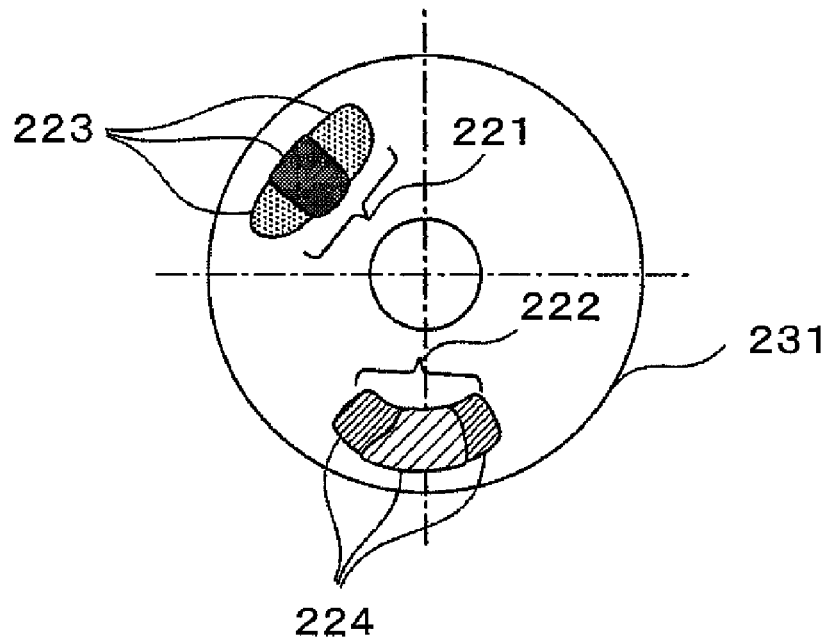
FIGS. 14A and 14B show a display example of the defect detected by the pattern shape inspection apparatus according to the present invention.
Figure 14B:
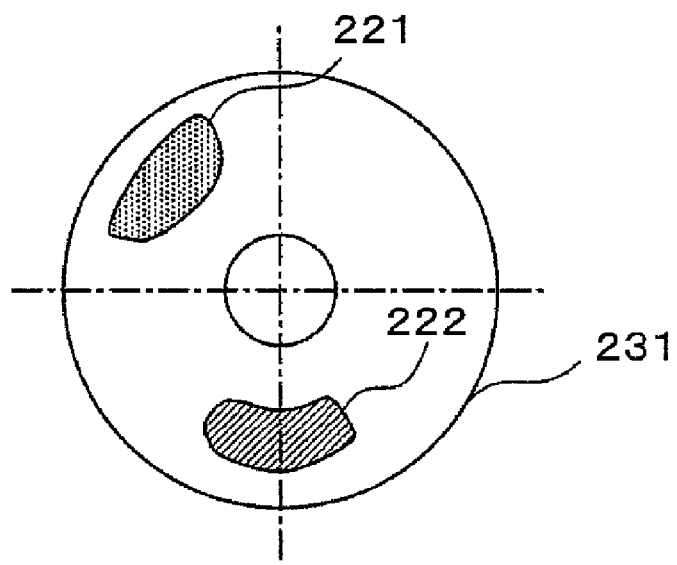

The discrete track medium is employed as the inspection object in the second embodiment. However, the bit patterned medium may be subjected to the same process as described above. FIG. 14 A and B illustrate display examples of the detected defect to the input/output terminal 9 as a result of inspection of the entire surface of the disk. FIG. 14A is a view of a screen of the input/output terminal 9 showing the two-dimensional distribution of the pattern shape defect types 221, 222 and their sizes 223, 224 detected on the disk 231 corresponding to the first embodiment. FIG. 14B is a view of a screen of the input/output terminal 9 showing the two-dimensional distribution of the pattern shape defect types 221, 222 of the disk 231 corresponding to the second embodiment to be displayed on the display of the input/output terminal 9.

The present invention allows inspecting the shape (for example, width, height, side wall angle of the track) of the fine line pattern having dimensions of several tens nm or less as well as the pattern edge state (line edge roughness) formed on a patterned medium type magnetic recording disk, especially the discrete track medium, the stamper thereof, or the master as the stamper mold at high speeds with high sensitivity.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A pattern shape inspection method comprising:
    a first step of irradiating wideband illuminating light which contains far ultraviolet light from a perpendicular direction to a sample with a pattern which moves in a radial direction while rotating, inspecting a shape of the pattern based on a spectral waveform of light reflected from the sample to which the wideband illuminating light is irradiated, and detecting an edge roughness of the pattern based on the spectral waveform of the light reflected from the sample; and
    a second step of irradiating a laser beam to the sample from an oblique direction, and detecting the edge roughness of the pattern based on light scattered from the sample to which the laser beam is irradiated.

2. The pattern shape inspection method according to claim 1, wherein when the edge roughness of the pattern is detected based on the light scattered from the sample in the second step, the edge roughness of the pattern is detected based on the spectral waveform of the reflecting light from the sample detected in the first step.

3. The pattern shape inspection method according to claim 2,
    wherein an optical model is formed to indicate a roughness layer formed on a pattern side wall surface corresponding to the edge roughness of the pattern, and to obtain an optical constant of the roughness layer through effective medium approximation; and
    the optical model is used to detect the edge roughness of the pattern based on the spectral waveform of the reflecting light detected from the sample in the first step when the edge roughness of the pattern is detected in the second step.

4. The pattern shape inspection method according to claim 1,
    wherein an optical model is formed to indicate a roughness layer formed on a pattern side wall surface corresponding to the edge roughness of the pattern, and to obtain an optical constant of the roughness layer through effective medium approximation; and
    the optical model is used to detect the edge roughness of the pattern based on the spectral waveform of the reflecting light detected from the sample in the first step.

5. The pattern shape inspection method according to claim 1, wherein the sample is one of a discrete track medium, a stamper as a mold of the discrete track medium, and a master as a mold of the stamper.

6. A pattern shape inspection method comprising:
    irradiating wideband illuminating light which contains far ultraviolet light to a sample with a pattern from a perpendicular direction;
    inspecting a shape of the pattern based on a spectral waveform of light reflected from the sample to which the wideband illuminating light is irradiated; and
    detecting an edge roughness of the pattern based on the spectral waveform of the light reflected from the sample.

7. The pattern shape inspection method according to claim 6,
    wherein an optical model is formed to indicate a roughness layer formed on a pattern side wall surface corresponding to the edge roughness of the pattern, and to obtain an optical constant of the roughness layer through effective medium approximation; and
    the optical model is used to detect the edge roughness of the pattern based on the spectral waveform of the light reflected from the sample.

8. The pattern shape inspection method according to claim 6, further comprising a step of irradiating a laser beam to the sample from an oblique direction, and detecting the edge roughness of the pattern based on light scattered from the sample to which the laser beam is irradiated.

9. The pattern shape inspection method according to claim 6, wherein the wideband wavelength illuminating light is irradiated to the sample which moves in a radial direction while rotating.

10. The pattern shape inspection method according to claim 6, wherein the sample is semiconductor ware.

11. A pattern shape inspection apparatus comprising:
    a moving mechanism for rotating and moving a sample with a pattern in a radial direction;
    a spectral detection optical system for irradiating wideband wavelength illuminating light which contains far ultrasonic light from a perpendicular direction to the sample which is moved by the moving mechanism while being rotated, and detecting a spectral waveform of light reflected from the sample to which the wideband wavelength illuminating light is irradiated; and
    a shape inspection process unit for inspecting a shape of the pattern based on the spectral waveform of the light reflected from the spectral detection optical system, and further detecting an edge roughness of the pattern based on the spectral waveform of light reflected from the sample.

12. The pattern shape inspection apparatus according to claim 11, further comprising:
    a scattered light detection optical system for irradiating a laser beam to the sample which is moved by the moving mechanism while being rotated from an oblique direction, and detecting light scattered from the sample to which the laser beam is irradiated; and
    an edge roughness detection unit for detecting the edge roughness of the pattern based on the light scattered from the sample and detected by the scattered light detection optical system.

13. A pattern shape inspection apparatus comprising:
    a stage mechanism on which a sample with a pattern is mounted;
    a spectral detection optical system for irradiating wideband wavelength illuminating light which contains far ultraviolet light from a perpendicular direction to the sample mounted on the stage mechanism, and detecting spectral waveform of light reflected from the sample to which the wideband illuminating light is irradiated; and a shape inspection process unit for inspecting a shape of the pattern based on the spectral waveform of the light reflected from the sample and detected by the spectral detection optical system, and further detecting an edge roughness of the pattern based on the spectral waveform of the light reflected from the sample.

14. The pattern shape inspection apparatus according to claim 13, further comprising:

a scattered light detection optical system for irradiating a laser beam to the sample mounted on the stage mechanism from an oblique direction, and detecting light scattered from the sample to which the laser beam is irradiated; and an edge roughness detection unit for detecting the edge roughness of the pattern based on the light scattered from the sample and detected by the scattered light detection optical system.

* * * * *